US007770006B2

(12) United States Patent
Wong et al.

(10) Patent No.: US 7,770,006 B2
(45) Date of Patent: Aug. 3, 2010

(54) METHOD AND APPARATUS FOR AUTHORIZING A DATABASE OPERATION

(75) Inventors: Daniel ManHung Wong, Sacramento, CA (US); MingKang Xu, Fremont, CA (US); Paul Youn, Redwood City, CA (US); MinHank Ho, Newark, CA (US); Chon Hei Lei, Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1313 days.

(21) Appl. No.: 11/139,709

(22) Filed: May 26, 2005

(65) Prior Publication Data

US 2006/0271783 A1 Nov. 30, 2006

(51) Int. Cl.
*H04L 9/32* (2006.01)
*G06F 21/00* (2006.01)
*G06F 17/30* (2006.01)

(52) U.S. Cl. .............................. 713/169; 707/1; 707/10
(58) Field of Classification Search .................. 713/169; 707/1, 10
See application file for complete search history.

(56) References Cited

U.S. PATENT DOCUMENTS

| | | | |
|---|---|---|---|
| 6,396,929 B1 * | 5/2002 | Chandersekaran et al. .. | 380/286 |
| 6,775,668 B1 | 8/2004 | Goel .............................. | 707/9 |
| 6,910,041 B2 * | 6/2005 | Exton et al. ..................... | 707/9 |
| 6,947,989 B2 * | 9/2005 | Gullotta et al. ............. | 709/226 |
| 2006/0235789 A1 * | 10/2006 | Koch ........................... | 705/39 |

\* cited by examiner

*Primary Examiner*—Kambiz Zand
*Assistant Examiner*—William S Powers
(74) *Attorney, Agent, or Firm*—Park, Vaughan & Fleming LLP; Laxman Sahasrabuddhe

(57) ABSTRACT

One embodiment of the present invention provides a system that authorizes a sensitive database operation. During operation, the system receives a request to perform a sensitive database operation. Note that, a sensitive database operation is an operation which, in the hands of a malicious user, poses a serious security threat. Next, the system determines a multiparty authorization requirement for the sensitive database operation, wherein the multiparty authorization requirement specifies a set of approvals required for authorizing the sensitive database operation. The system then sends approval requests to one or more approving parties based on the multiparty authorization requirement. Next, the system receives approvals for authorizing the sensitive database operation. The system then determines whether the approvals satisfy the multiparty authorization requirement. Next, if the approvals satisfy the multiparty authorization requirement, the system authorizes the sensitive database operation, thereby allowing the database to perform the sensitive database operation.

18 Claims, 2 Drawing Sheets

METHOD AND APPARATUS FOR AUTHORIZING A DATABASE OPERATION

BACKGROUND

1. Field of the Invention

The present invention relates to database security. More specifically, the present invention relates to a method and apparatus for authorizing a database operation.

2. Related Art

As computer systems store ever-larger amounts of sensitive data, it is becoming increasingly important to protect these systems from malicious users. The global costs incurred from security breaches can run into billions of dollars annually, and the cost to individual companies can be severe, sometimes catastrophic.

To prevent malicious users from accessing private data, database systems often use encryption. Note that, in an encrypted database, even if a malicious user gains access to the encrypted data, the user cannot use the encrypted data unless the user has the appropriate key to decrypt the data.

Unfortunately, although encryption protects private data from malicious users, encryption does not prevent malicious users from executing potentially harmful database operations.

Specifically, in present database systems, database administrators (DBAs) are typically granted privileges to perform any operation. This can create serious security problems, because, if malicious users gain DBA level privileges, they can perform database operations that severely damage or disrupt the system. Furthermore, even during normal operation of the database system, granting all powerful privileges to a DBA makes it very difficult to enforce accountability and separation of duty.

Additionally, note that there are typically a number of DBAs in an organization. This exacerbates the security problem because the database system is compromised even if only one of the DBAs is malicious.

Hence, what is needed is a method and an apparatus for database security without the above-described problems.

SUMMARY

One embodiment of the present invention provides a system that authorizes a sensitive database operation. During operation, the system receives a request to perform a sensitive database operation. Note that, a sensitive database operation is an operation which, in the hands of a malicious user, poses a serious security threat. Examples of sensitive database operations include, but are not limited to, operations that (a) grant privileges to a user, (b) revoke privileges of a user, (c) change security keys or passwords of a user, and (d) change user account information. Next, the system determines a multiparty authorization requirement for the sensitive database operation, wherein the multiparty authorization requirement specifies a set of approvals required for authorizing the sensitive database operation. The system then sends approval requests to one or more approving parties based on the multiparty authorization requirement. Next, the system receives approvals for authorizing the sensitive database operation. The system then determines whether the approvals satisfy the multiparty authorization requirement. Next, if the approvals satisfy the multiparty authorization requirement, the system authorizes the sensitive database operation, thereby allowing the database to perform the sensitive database operation.

In a variation on this embodiment, the multiparty authorization requirement specifies at least two different types of approving parties whose approval is required for satisfying the multiparty authorization requirement. Specifically, an approving party type can be a database administrator (DBA), a key administrator, or an auditor.

In a variation on this embodiment, the system determines whether the approvals satisfy the multiparty authorization requirement by keeping track of the number and type of the received approvals.

In a variation on this embodiment, the system receives a key-share with each approval, wherein a key-share contains information that can be used with other key-shares to construct a key.

In a further variation on this embodiment, the system determines whether the approvals satisfy the multiparty authorization requirement by: constructing a key from the key-shares received with the approvals; and determining whether the approvals satisfy the multiparty authorization requirement based on whether the key passes an integrity check.

In a variation on this embodiment, the multiparty authorization requirements for the sensitive database operation are permanently built into the database system, thereby preventing modification of the multiparty authorization requirements during normal operation of the database system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Database System

Figure 1:
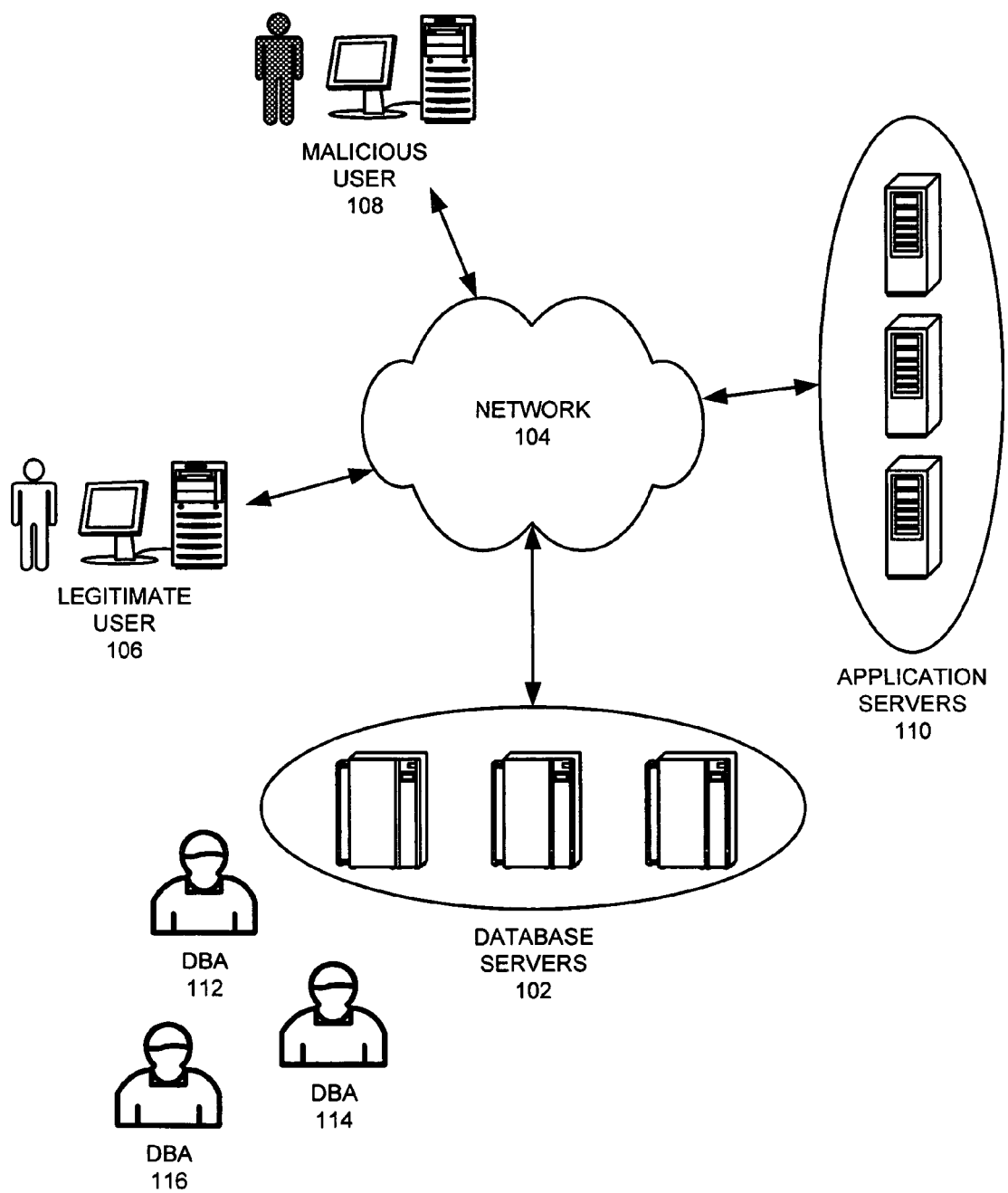
FIG. 1 illustrates a database system in accordance with an embodiment of the present invention.

FIG. 1 illustrates a database system in accordance with an embodiment of the present invention. The database system includes a set of application servers 110, a set of database servers 102, and database administrators (DBAs) 112, 114, and 116. Further, the figure illustrates two users (or clients): legitimate user 106 and malicious user 108. Users 106 and 108, application servers 110, and database servers 102 can communicate with one another via network 104.

Networks 104 can generally include any type of wire or wireless communication channel capable of coupling together computing nodes. This includes, but is not limited to, a local area network, a wide area network, or a combination of networks. In one embodiment of the present invention, network 104 can include the Internet. Network 104 can also be a private network. Note that in some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

Database administrators (DBAs) 112, 114, and 116 are users with special privileges who are responsible for the operation and maintenance of database servers 102. DBAs typically have the privilege to modify data stored in the storage system.

Database clients allow a user, such as legitimate user 106, to enter data through a user interface, such as a web browser. This data can be sent to one of the application servers 110 across network 104. The application server then forms a database query using the data supplied by client 106 and forwards this query to the database servers 102 across network 108. Database servers 102 validate the query and, if valid, perform the requested operation.

Today, database systems are being used to store ever-larger amounts of sensitive data. As a result, it is becoming increasingly important to protect this sensitive data from unauthorized accesses.

One of the major challenges in database security is to allow legitimate users, such as user 106, to access the system, but prevent malicious users, such as users 108, from accessing or modifying data.

Present database systems use a variety of techniques to prevent malicious users from accessing private data. For example, database systems typically require a user to provide a password (or secret key) during login. Unfortunately, malicious users can circumvent password based security mechanisms by guessing passwords or finding other means to bypass the secure login process. Furthermore, note that a DBA can usually access all data in a database. Consequently, a malicious DBA can typically access private data in password based systems.

To prevent malicious users from accessing private data, database systems often use encryption. Note that, in an encrypted database, even if a malicious user gains access to the encrypted data, he/she cannot use the encrypted data unless he/she has the user key to decrypt the data.

Unfortunately, encryption is not enough to secure a database system. Although encryption protects private data from malicious users, it does not prevent them from executing potentially harmful database operations. For example, a malicious user can revoke permissions of a user or change the password of a user, thereby preventing the user from accessing the database. Likewise, a malicious user can grant privileges to a user who does not have appropriate security clearances to access a restricted database table.

Furthermore, note that there are typically a number of DBAs in an organization. This exacerbates the security problem because the database system is compromised even if only one of the DBAs is malicious.

Process for Authorizing a Sensitive Database Operation

Figure 2:
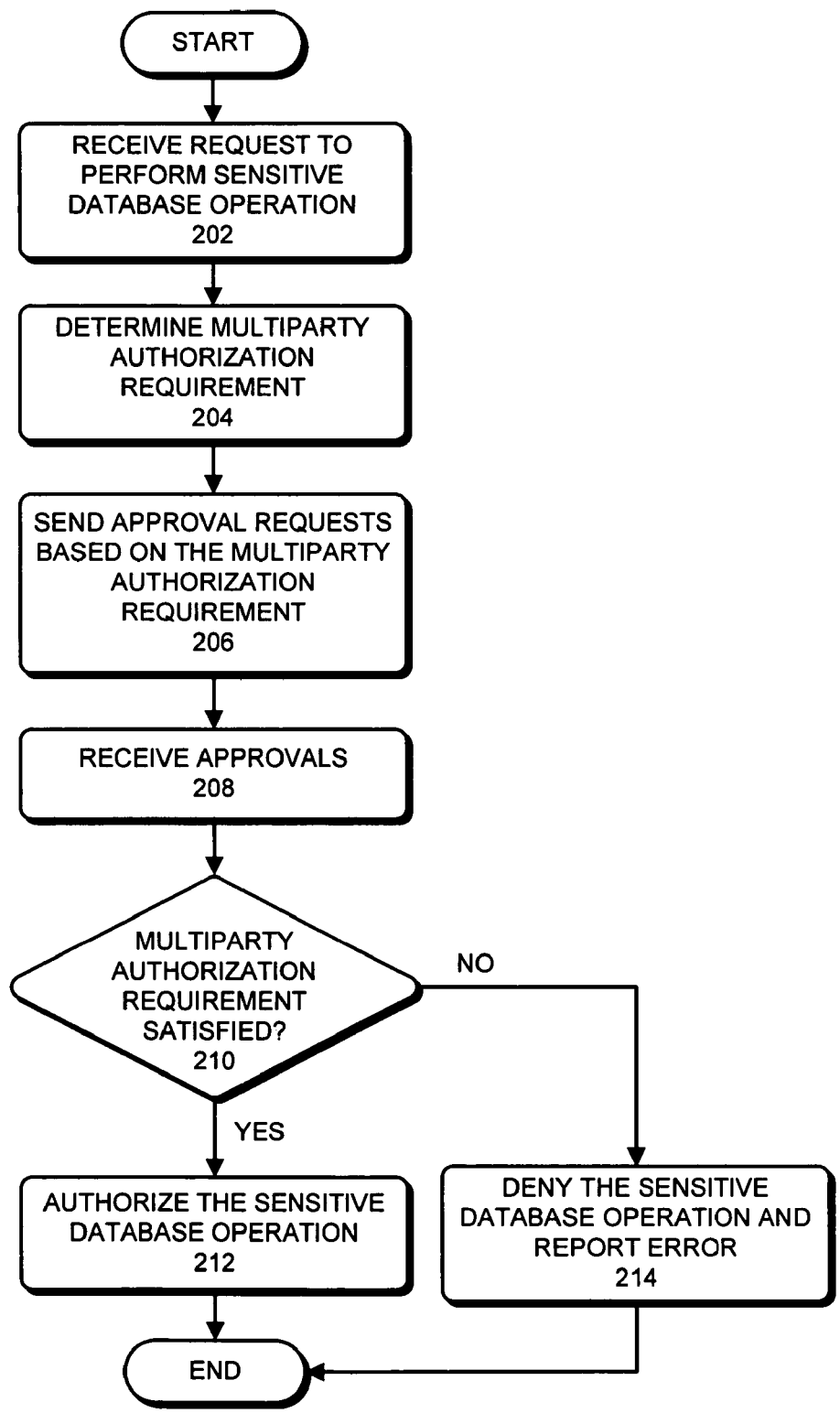
FIG. 2 presents a flowchart that illustrates a process of authorizing a sensitive database operation in accordance with an embodiment of the present invention.

FIG. 2 presents a flowchart that illustrates a process of authorizing a sensitive database operation in accordance with an embodiment of the present invention.

The process typically begins with the system receiving a request to perform a sensitive database operation (step 202).

The system then determines a multiparty authorization requirement for the sensitive database operation (step 204). Note that a multiparty authorization requirement specifies a set of approvals required to authorize the sensitive database operation.

Note that large organizations are often subdivided into smaller groups, each with its own database system. These database systems are usually managed by local DBAs within each group. Consequently, some organizations use special types of database users, such as, auditors and key administrators, to ensure that DBAs adhere to a consistent set of database management and security policies.

One embodiment of the present invention leverages these special user types to authorize sensitive database operations. Specifically, in one embodiment, the multiparty authorization requirement specifies at least two different types of approving parties whose approval is required for satisfying the multiparty authorization requirement. Examples of approving party types include, but are not limited to, database administrators (users responsible for maintaining the database), key administrators (users responsible for key creation and deletion), and auditors (users responsible for ensuring that the company's database and security policies are being followed consistently). For example, changing the password of a user may require authorization from a DBA and a key administrator. Similarly, granting high level privileges to a user may require authorization from a DBA and an auditor.

In general, these user types and associated responsibilities help the system to specify appropriate authorization requirements for sensitive database operations. Accordingly, many modifications and variations will be apparent to practitioners skilled in the art. In particular, the above-described user types are not intended to limit the present invention.

Furthermore, it will be apparent that a number of user and system parameters can be used for specifying a multiparty authorization requirement. For example, an authorization requirement can specify deadlines for each user or user type within which the approval must be received.

Additionally, a multiparty authorization requirement can involve satisfying an arbitrarily complex set of conditions. For example, a multiparty authorization requirement can specify that the received approvals must meet one of the following conditions in order to authorize an operation: (a) an approval each from a DBA and an auditor, or (b) approvals from at least two users who are at or above the vice-president level in an organization.

Note that it is critical to prevent malicious users from modifying multiparty authorization requirements. Because otherwise, malicious users can defeat the whole purpose of multiparty authorization by simply modifying the multiparty authorization requirement to suit their needs.

In one embodiment, a set of multiparty authorization requirements can be permanently built into the database system, thereby preventing malicious users from modifying multiparty authorization requirements. For example, during installation, a set of multiparty authorization requirements can be hard coded into the database execution engine, thereby preventing modification of these requirements during normal operation of the database system.

Specifically, in one embodiment, the system hard codes multiparty authorization requirements for all database operations that create, delete, or modify a multiparty authorization requirement. By doing this the system ensures that a malicious user will not be able to modify a multiparty authorization requirement by himself or herself. Note that, in this embodiment, the system does not hard code all multiparty authorization requirements; it only hard codes those that are associated with database operations that create/delete/modify multiparty authorization requirements. This allows the system to create new authorization requirements during runtime, while preventing malicious users from modifying authorization requirements on their own.

Next, the system sends approval requests to one or more approving parties based on the multiparty authorization requirement (step 206).

Note that the system can use a variety of techniques, such as, e-mails, telephone calls, system alerts, etc., to send approval requests to the approving parties.

Further, in one embodiment, the system sends an identification number (or tag) with an approval request. This allows the system to correlate approval responses with outstanding approval requests.

The system then receives approvals for authorizing the sensitive database operation (step 208).

Next, the system determines whether the received approvals satisfy the multiparty authorization requirement (step 210).

Note that a variety of techniques can be used for determining whether the received approvals satisfy a multiparty authorization requirement. For example, the system can represent a multiparty authorization requirement by specifying the number and type of approvals required for authorizing a database operation.

Note that the "type" of an approval can be the same as the type of the user sending the approval. Hence, if a multiparty authorization requirement requires one approval each from a DBA and an auditor, then this requirement can be stated as follows: one approval of type "DBA" and one approval of type "auditor." Furthermore, a multiparty authorization requirement can also require an approval from a specific a user. For example, a multiparty authorization requirement can require one approval from a DBA and one approval from user "Bob."

Next, the system can keep track of the number and type of approvals received. The system can then determine whether the received approvals satisfy the multiparty authorization requirement by comparing the number and type of the received approvals with those specified in the multiparty authorization requirement.

In another embodiment, the system uses the concept of "key sharing" (or "key splitting") to determine whether the received approvals satisfy the multiparty authorization requirement. Note that key sharing is a well known concept for distributing a key amongst a group of parties. Specifically, each party is allocated a key-share, such that the information contained within an individual key-share cannot be used to construct the key. To construct the key, a system has to use information contained within multiple, distinct key-shares. For further details of different techniques for key sharing, refer to Bruce Schneier, *Applied Cryptography*, Second Edition, John Wiley & Sons, 1996.

Specifically, in one embodiment, the system receives a key-share with each approval. The system then constructs a key from the key-shares received with the approvals. Next, the system determines whether the approvals satisfy the multiparty authorization requirement based on whether the key passes an integrity check. It will be apparent that a number of techniques can be used to check the integrity of the constructed key. For example, the system can determine that the constructed key passes an integrity check if the constructed key matches a stored copy of the original key. In another embodiment, the constructed key is used to decrypt an encrypted-message, and then the decrypted encrypted-message is compared with a stored message to determine whether the key passed the integrity check.

Furthermore, note that a variety of techniques can be used to ensure the authenticity of these approvals. For example, each approval can be digitally signed using PKI (Public Key Infrastructure).

If the approvals satisfy the multiparty authorization requirement, the system then authorizes the sensitive database operation, thereby allowing the database to perform the sensitive database operation (step 212).

On the other hand, if the approvals do not satisfy the multiparty authorization requirement, the system can deny the sensitive database operation and report an error (step 214).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for authorizing a sensitive database operation, the method comprising:

receiving, at a database, a request to perform a sensitive database operation, wherein the sensitive database operation changes a database user's privilege to access database records;

determining a multiparty authorization requirement for the sensitive database operation, wherein the multiparty authorization requirement specifies a set of approvals required for authorizing the sensitive database operation and a database user type associated with the set of approvals, and wherein the multiparty authorization requirements associated with database operations that create, delete, or modify a multiparty authorization requirement are hard coded into the database execution engine, thereby preventing a malicious user from modifying the multiparty authorization requirements;

sending approval requests to one or more approving parties based on the multiparty authorization requirement;

receiving approvals for authorizing the sensitive database operation;

if the approvals satisfy the multiparty authorization requirement, authorizing the sensitive database operation.

2. The method of claim 1, wherein the multiparty authorization requirement specifies at least two different types of approving parties whose approval is required for satisfying the multiparty authorization requirement;

wherein an approving party type is one of a database administrator (DBA), a key administrator, or an auditor.

3. The method of claim 1, wherein determining whether the approvals satisfy the multiparty authorization requirement involves keeping track of the number and type of the received approvals.

4. The method of claim 1, wherein receiving approvals for authorizing the sensitive database operation involves receiving a key-share with each approval, wherein a key-share contains information that is used with other key-shares to construct a key.

5. The method of claim 4, wherein determining whether the approvals satisfy the multiparty authorization requirement involves:

constructing a key from the key-shares received with the approvals; and determining whether the approvals satisfy the multiparty authorization requirement based on whether the key passes an integrity check.

6. The method of claim 1, wherein the multiparty authorization requirements for the sensitive database operation are permanently built into the database system, thereby preventing modification of the multiparty authorization requirements during normal operation of the database system.

7. A computer-readable storage medium storing instructions that when executed by a computer cause the computer to perform a method for authorizing a sensitive database operation, the method comprising:

receiving, at a database, a request to perform a sensitive database operation, wherein the sensitive database operation changes a database user's privilege to access database records;

determining a multiparty authorization requirement for the sensitive database operation, wherein the multiparty authorization requirement specifies a set of approvals required for authorizing the sensitive database operation and a database user type associated with the set of approvals, and wherein the multiparty authorization requirements associated with database operations that create, delete, or modify a multiparty authorization requirement are hard coded into the database execution engine, thereby preventing a malicious user from modifying the multiparty authorization requirements;

sending approval requests to one or more approving parties based on the multiparty authorization requirement;

receiving approvals for authorizing the sensitive database operation;

if the approvals satisfy the multiparty authorization requirement, authorizing the sensitive database operation.

8. The computer-readable storage medium of claim 7, wherein the multiparty authorization requirement specifies at least two different types of approving parties whose approval is required for satisfying the multiparty authorization requirement;

wherein an approving party type is one of a database administrator (DBA), a key administrator, or an auditor.

9. The computer-readable storage medium of claim 7, wherein determining whether the approvals satisfy the multiparty authorization requirement involves keeping track of the number and type of the received approvals.

10. The computer-readable storage medium of claim 7, wherein receiving approvals for authorizing the sensitive database operation involves receiving a key-share with each approval, wherein a key-share contains information that is used with other key-shares to construct a key.

11. The computer-readable storage medium of claim 10, wherein determining whether the approvals satisfy the multiparty authorization requirement involves:

constructing a key from the key-shares received with the approvals; and determining whether the approvals satisfy the multiparty authorization requirement based on whether the key passes an integrity check.

12. The computer-readable storage medium of claim 7, wherein multiparty authorization requirements for the sensitive database operation are permanently built into the database system, thereby preventing modification of the multiparty authorization requirements during normal operation of the database system.

13. An apparatus for authorizing a sensitive database operation, the apparatus comprising:

a request-receiving mechanism configured to receive, at a database, a request to perform a sensitive database operation, wherein the sensitive database operation changes a database user's privilege to access database records;

a requirement-determining mechanism configured to determine a multiparty authorization requirement for the sensitive database operation, wherein the multiparty authorization requirement specifies a set of approvals required for authorizing the sensitive database operation and a database user type associated with the set of approvals, and wherein the multiparty authorization requirements associated with database operations that create, delete, or modify a multiparty authorization requirement are hard coded into the database execution engine, thereby preventing a malicious user from modifying the multiparty authorization requirements;

a sending mechanism configured to send approval requests to one or more approving parties based on the multiparty authorization requirement;

an approval-receiving mechanism configured to receive approvals for authorizing the sensitive database operation; and an authorizing mechanism, wherein if the approvals satisfy the multiparty authorization requirement, the authorizing mechanism is configured to authorize the sensitive database operation.

14. The apparatus of claim 13, wherein the multiparty authorization requirement specifies at least two different types of approving parties whose approval is required for satisfying the multiparty authorization requirement;

wherein an approving party type is one of a database administrator (DBA), a key administrator, or an auditor.

15. The apparatus of claim 13, wherein the satisfaction-determining mechanism is configured to keep track of the number and type of the received approvals.

16. The apparatus of claim 13, wherein the approval-receiving mechanism is configured to receive a key-share with each approval, wherein a key-share contains information that is used with other key-shares to construct a key.

17. The apparatus of claim 16, wherein the satisfaction-determining mechanism is configured to:

construct a key from the key-shares received with the approvals; and determine whether the approvals satisfy the multiparty authorization requirement based on whether the key passes an integrity check.

18. The apparatus of claim 13, wherein the multiparty authorization requirements for the sensitive database operation are permanently built into the database system, thereby preventing modification of the multiparty authorization requirements during normal operation of the database system.

* * * * *